(12) United States Patent
Obara et al.

(10) Patent No.: US 7,661,882 B2
(45) Date of Patent: Feb. 16, 2010

(54) FLUID DYNAMIC PRESSURE BEARING DEVICE, SPINDLE MOTOR PROVIDED WITH THE FLUID DYNAMIC PRESSURE BEARING DEVICE, AND RECORDING DISK DRIVE DEVICE

(75) Inventors: Rikuro Obara, Kitasaku-Gun (JP); Tadashi Akahori, Kitasaku-Gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 444 days.

(21) Appl. No.: 11/666,742

(22) PCT Filed: Nov. 29, 2005

(86) PCT No.: PCT/IB2005/003594

§ 371 (c)(1),
(2), (4) Date: May 18, 2007

(87) PCT Pub. No.: WO2006/059205

PCT Pub. Date: Jun. 8, 2006

(65) Prior Publication Data

US 2008/0095480 A1 Apr. 24, 2008

(30) Foreign Application Priority Data

Dec. 1, 2004 (JP) ............................. 2004-348135

(51) Int. Cl.
*F16C 32/06* (2006.01)
*F16C 33/66* (2006.01)

(52) U.S. Cl. ...................... 384/100; 384/107; 384/112; 384/123

(58) Field of Classification Search ................. 384/100, 384/107, 110, 113–115, 123–124, 132, 112, 384/119

See application file for complete search history.

(56) References Cited

U.S. PATENT DOCUMENTS

| 5,634,724 | A | * | 6/1997 | Zang et al. | 384/107 |
| 5,876,124 | A | * | 3/1999 | Zang et al. | 384/107 |
| 6,154,339 | A | * | 11/2000 | Grantz et al. | 384/110 |
| 6,296,391 | B1 | | 10/2001 | Hayakawa et al. | |
| 6,814,492 | B2 | * | 11/2004 | Beckers | 384/119 |
| 6,854,889 | B2 | * | 2/2005 | Nishimura et al. | 384/132 |
| 6,900,568 | B2 | * | 5/2005 | LeBlanc et al. | 384/100 |

(Continued)

FOREIGN PATENT DOCUMENTS

EP 0 697 535 A2 2/1996
JP A 2002-155940 5/2002

*Primary Examiner*—Marcus Charles
(74) *Attorney, Agent, or Firm*—Oliff & Berridge, PLC

(57) ABSTRACT

A fluid dynamic pressure bearing device includes a shaft member (5) and a bearing member (41), at least one of the shaft member or the bearing member being rotatable with respect to the other. A shaft member-side annular member (13) is fixed with respect to the shaft member. The shaft member-side annular member includes a large-diameter rim portion and a small-diameter outer circumferential surface portion. A bearing member-side annular member (14) is fixed with respect to the bearing member. The bearing member-side annular member includes an inner circumferential large-diameter step portion, and a small-diameter inner circumferential surface portion. A plurality of convex surface portions are formed either on a surface of the inner circumferential large-diameter step portion facing the large-diameter rim portion of the shaft member-side annular member, or on a surface of the large-diameter rim portion of the shaft member-side annular member facing a surface of the inner circumferential large-diameter step portion. A reflux groove (17) surrounds the convex surface portions.

7 Claims, 8 Drawing Sheets

U.S. PATENT DOCUMENTS 7,059,772 B2 * 6/2006 Oku et al. .................. 384/132
2001/0046336 A1 11/2001 Saeki et al.
2002/0003678 A1 1/2002 Sakuragi et al.
2004/0165797 A1 8/2004 Oku et al.

* cited by examiner

FLUID DYNAMIC PRESSURE BEARING DEVICE, SPINDLE MOTOR PROVIDED WITH THE FLUID DYNAMIC PRESSURE BEARING DEVICE, AND RECORDING DISK DRIVE DEVICE

BACKGROUND

1. Field of the Invention

This invention relates to a fluid dynamic pressure bearing device that may be used in a motor, particularly a small, thin spindle motor. The fluid dynamic pressure bearing device is excellent in bearing rigidity and rotation precision and also excellent in suppression of lubricant leakage and splashing due to external vibration or shock applied during motor stopping and rotation, for example. The fluid dynamic pressure bearing device can also reliably engage with a rotor member. The invention also relates to a spindle motor and a recording disk drive device provided with the fluid dynamic pressure bearing device.

2. Description of Related Art

Recently, hard disk drives have been made smaller, thinner, larger in hard disk storage capacity, and faster. Meanwhile, devices such as computers or the like in which hard disk drives are mounted have been made smaller and lighter, and application of the hard disk drives to portable devices has become widespread. In the case of portable devices, vibration and shock due to carrying frequently occur. For example, there are many chances for vibration and shock to occur during motor rotation while the portable devices are being used during transportation on trains, planes, vehicles, etc. There is a strong demand for rotation precision and other reliability assurances to help avoid adverse effects from the vibration and shock that can occur in these situations. This invention responds to that demand.

Japanese Laid-Open Patent Application 2002-155940A discloses a fluid dynamic pressure bearing device intended to solve the problem of torque increase and the problem of lubricant liquid leaking to the outside, which occur as a flange diameter of a shaft becomes large, and which are obstacles to designing smaller fluid dynamic pressure bearings.

As shown in FIGS. 1 and 2 of the above-mentioned application (FIGS. 10 and 11 of this application), this fluid dynamic pressure bearing device is provided with a housing 01 and a shaft 03 that is rotated within a through-hole 02 of the housing 01. Lubricant 06 is filled in a gap between the housing 01 and the shaft 03. A flange 04 of the shaft 03 is engaged with an annular concave portion 05 on an inner surface of the housing 01. Thrust dynamic pressure generating portions B1, B2 are formed between upper and lower surfaces 04a, 04b of the flange 04 and the annular concave portion 05. Furthermore, to solve the above-mentioned problems, communication paths 011 are formed that extend from the through-hole 02 side of the housing 01 to the outer surface 05c of the annular concave portion 05, and open to the through-hole 02 and to the outer surface 05c. These communication paths 011 are formed in the portion of housing 01 that is on the side of the upper surface 04a side of the flange 04.

FIG. 4 of the above-mentioned application (FIG. 12 of this application) shows another related structure. When a top surface 044a of a flange 044 of a shaft 043 facing a thrust dynamic pressure generating portion B1 is floatingly rotated, or approaches an upper side inner surface (ceiling surface) 045a of an annular concave portion 045 formed in an inner surface of a through-hole 042 of a housing 041 due to vibration and/or shock, lubricant on the thrust dynamic pressure generating portion B1 side is compressed, and a negative pressure is created in the lubricant on the thrust dynamic pressure generating portion B2 side, which is on the opposite side of the flange 044 from the thrust dynamic pressure generating portion B1. Therefore, B1 side lubricant must be promptly moved to the B2 side. In order to perform this movement promptly, through-holes 051 that communicate between the B1 side and the B2 side are formed parallel to the shaft.

However, in order to form the shaft-direction through-holes 051 shown in FIG. 12, the external diameter dimension of the flange 044 needs to be enlarged to provide enough space for the through-holes. When the external diameter dimension is enlarged, there is a problem in that the torque increases. To suppress the torque increase, the invention described in Japanese Laid-Open Patent Application 2002-155940A discloses that instead of the through-holes 051, communication paths 011 are formed in the housing 01 portion on the upper surface 04a side of the flange 04, as shown in FIG. 2 (FIG. 11 of this application). These communication paths 011 pass from the through-hole 02 side of the housing 01 to the bottom surface 05c of the annular concave portion 05, and are opened to the through-hole 02 and the bottom surface 05c. Furthermore, each communication path 011 is constituted by a diameter-direction hole 011a and a cut portion 011b that intersects the diameter-direction hole 011a and is opened to the bottom surface 05c of the annular concave portion 05.

An object of the fluid dynamic pressure bearing device of the above-mentioned application is to eliminate the shaft-direction through-holes 051 (see FIG. 12 of this application) and suppress the increase of the external diameter dimension of the flange 04 of the shaft 03, and thereby suppress torque increase. A solution to the problem is to form communication paths 011 in the housing 01 portion opposite to the flange upper surface 04a. As a secondary effect of forming these communication paths 011, there is generated an operation effect of stopping the lubricant in the cut portions 011b of the communication paths 011. Thrust dynamic pressure generating grooves are directly formed in the flange top surface 04a. Opposite to the thrust dynamic pressure generating grooves, a surface that directly receives a generated thrust dynamic pressure force is arranged on the housing 01 portion. This surface is an inner surface 05a, which makes a ceiling surface of the annular concave portion 05. The communication paths 011 are formed at a predetermined depth from the inner surface 05a, pointing in a diameter direction.

Furthermore, in the fluid dynamic pressure bearing device of the above-mentioned application, when the gap at the thrust dynamic pressure generating portion B1 or B2 reduces, lubricant is smoothly circulated via the communication paths 011 formed in the housing 01. Therefore, lubricant leakage from an outside opening portion 07 of the through-hole 02 of the housing 01 can be suppressed.

SUMMARY

However, in the case of the fluid dynamic pressure bearing device of the above-mentioned application, when the flange upper surface 04a having the thrust dynamic pressure generating grooves receives vibration, shock, or the like during a rotation operation and fluctuates up or down, approaching the opposing surface of the housing 01 or separating therefrom, a pumping operation that compresses or draws in the lubricant is generated in the thrust dynamic pressure generating portion B1 between the opposing surfaces.

For example, when the flange upper surface 04a fluctuates on the inner surface 05a side of the annular concave portion

05, lubricant in the thrust dynamic pressure generating portion B1 has to be compressed by a pumping operation, and drawn in and moved, in cooperation with the fluctuation operation, toward the thrust dynamic pressure generating portion B2 on the flange lower surface 04*b* side. Conversely, when the flange lower surface 04*b* fluctuates on the inner surface 05*b* side of the annular concave portion 05, lubricant in the thrust dynamic pressure generating portion B2 has to be compressed by a pumping operation, and drawn in and moved, in cooperation with the fluctuation operation, toward the thrust dynamic pressure generating portion B1 on the flange upper surface 04*a* side.

When the up/down fluctuation of the flange upper surface 04*a* and the flange lower surface 04*b* occurs, i.e., when the up/down fluctuation of the flange 04 occurs, particularly when the flange upper surface 04*a* fluctuates on the inner surface 05*a* side, lubricant between the flange upper surface 04*a* and the inner surface 05*a* (thrust dynamic pressure generating portion B1) facing each other is compressed by a pumping operation, and movement is generated in the outer circumferential direction of the flange 04 and in the direction of the outside opening portion 07 of the through-hole 02. In this case, the lubricant that moves in the outer circumferential direction of the flange 04 moves directly on the flange lower surface 04*b* side. The lubricant that moves in the direction of the outside opening portion 07 must go through the diameter-direction holes 011*a* of the communication paths 011, move in the direction of the cut portions 011*b*, and further move from there to the flange lower surface 04*b* side.

In this case, the structure is such that particularly the lubricant that moves in the direction of the outside opening portion 07 of the through-hole 02 is restricted so as to pass through the diameter-direction holes 011*a*. These diameter-direction holes 011*a* may be formed as round holes by drill processing or the like in a separate housing 01*a* that is a separate piece from the housing 01, or may be formed as diameter-direction grooves on the lower surface of the separate housing 01*a* and covered by a separate cover.

Therefore, the lubricant that moves in the direction of the outside opening portion 07 of the through-hole 02 must move through a so-called limited tunnel path. Because of this, if vibration or shock is not significant during a normal rotation operation, the lubricant is collected in the diameter-direction hole 011*a* portions, which makes a tunnel path, by a pumping operation due to the up/down fluctuation of the flange 04, and there is no problem moving inside the diameter-direction hole 011*a* portions. However, if vibration or shock becomes significant due to rough handling, etc., the pumping operation becomes rapid, and the lubricant must move within the diameter-direction holes 011*a* in an extremely short period. In this tunnel path method, lubricant that moves in the direction of the outside opening portion 07 of the through-hole 02 cannot follow this rapid pumping operation, and leaks to the outside from the outside opening portion 07.

Furthermore, the communication paths 011 formed in the housing 01 are adjacent to the thrust dynamic pressure generating portion B1, so the lubricant in the space (thrust dynamic pressure generating portion B1) between the flange upper surface 04*a* and the inner surface 05*a* facing each other receives a double pumping operation. The double pumping operation includes a pumping operation based on the dynamic pressure generation and a pumping operation due to the rapid up/down fluctuation of the flange 04 because of vibration, shock, or the like. Because of this, there are the following disadvantages: it is easy to generate disturbance in the lubricant movement, the thrust dynamic pressure force can be easily affected, and bubbles can be easily introduced through the outside opening portion 07.

In the fluid dynamic pressure bearing device of the above-mentioned application, a dynamic pressure bearing structure is disclosed in which thrust dynamic pressure generating grooves are arranged (1) in the flange upper surface 04*a* portion, or the inner surface 05*a* portion of the annular concave portion 05 facing the flange upper surface 04*a* portion, and (2) in the flange lower surface 04*b* portion, or the inner surface 05*b* part of the annular concave portion 05 facing the flange lower surface 04*b* portion. No structural example is disclosed which does not have thrust dynamic pressure generating grooves on the flange upper surface 04*a* portion or the inner surface 05*a* portion of the annular concave portion 05 facing upper surface 04*a* portion.

Exemplary embodiments of this invention address the above-mentioned problems that exist in other fluid dynamic pressure bearing devices, and provide a smaller, thinner fluid dynamic pressure bearing device. Exemplary embodiments provide a fluid dynamic pressure bearing device that can reliably suppress lubricant leakage that is due to external vibration, shock, or the like during handling and maintain high rotation precision. Exemplary embodiments provide a spindle motor provided with the fluid dynamic pressure bearing device, and a recording disk drive device provided with the fluid dynamic pressure bearing device.

In one aspect, the invention may provide a fluid dynamic pressure bearing device, including a shaft member and a bearing member, at least one of the shaft member or the bearing member being rotatable with respect to the other. A micro gap is formed between the shaft member and the bearing member, and lubricant may be filled continuously in this micro gap. A shaft member-side annular member is fixed with respect to the shaft member, and has an axially inward end portion and an axially outward end portion. The shaft member-side annular member includes a large-diameter rim portion protruding outwardly in a radial direction, and a small-diameter outer circumferential surface portion, continuing from the large-diameter rim portion toward the axially outward end portion. A bearing member-side annular member is fixed with respect to the bearing member, and has an axially inward end portion and an axially outward end portion. The bearing member-side annular member includes an inner circumferential large-diameter step portion, and a small-diameter inner circumferential surface portion continuing from the inner circumferential large-diameter step portion toward the axially outward end portion. A plurality of convex surface portions are formed either on a surface of the inner circumferential large-diameter step portion facing the large-diameter rim portion of the shaft member-side annular member, or on a surface of the large-diameter rim portion of the shaft member-side annular member facing a surface of the inner circumferential large-diameter step portion. A reflux groove surrounds the convex surface portions, and allows flow of lubricant. At least one first dynamic pressure groove is formed in either an outer circumferential surface of the shaft member or an inner circumferential surface of the bearing member. The first dynamic pressure groove generates a dynamic pressure receiving a load in a radial direction. At least one second dynamic pressure groove is formed in either the lower surface of the large-diameter rim portion of the shaft member-side annular member or one end surface of the bearing member facing the lower surface of the large-diameter rim portion. The second dynamic pressure groove generates a dynamic pressure receiving a load in a thrust direction.

In this structure, a tunnel-type communication path is not formed in the thrust dynamic pressure generating portion.

Instead, convex surface portions are formed on the step portion surface of a substantially L-shaped inner circumferential large-diameter step portion of the bearing member-side annular member, which faces the upper end surface of the rim portion of the shaft member-side annular portion. The convex surface portions are preferably formed at an equal interval in a circumferential direction. A lubricant reflux path is formed so as to surround the convex surface portions. Additionally, one end of this reflux path is opened to a micro gap formed between the small-diameter outer circumferential surface portion of the shaft member-side annular member and the small-diameter inner circumferential surface portion of the bearing member-side annular member. The other end is opened to a micro gap formed between the large-diameter rim portion outer circumferential surface of the shaft member-side annular member and the large diameter portion inner circumferential surface of the bearing member-side annular member.

Therefore, this reflux path is not a tunnel-shaped communication path, but is a reflux path formed by an open groove, also called hereafter a reflux groove. When the shaft member-side annular member horizontally fluctuates at the time of rotation of the shaft member with respect to the bearing member, lubricant can easily and promptly flow through the reflux path. Even if abrupt vibration and/or shock is received at the time of handling, the shaft member-side annular member horizontally fluctuates abruptly, and lubricant in a micro gap between the top surface of the large-diameter rim portion of the shaft member-side annular member and the step portion surface of the inner circumferential large-diameter step portion of the bearing member-side annular member receives an abrupt pumping operation (drawing in, compression). Accordingly, lubricant can smoothly flow through the reflux path. At the same time, a function of suppressing splash or leakage of lubricant toward the outside opening portion can also be improved. Because of this, reliability of lubricant leakage suppression can be ensured, and high rotation precision can be maintained.

Additionally, the location where this type of pumping operation acts is a portion sandwiched by opposing surfaces. Thrust dynamic pressure generating grooves are not formed in any of the surfaces. Therefore, effects on the thrust dynamic pressure force can be eliminated.

Furthermore, the large-diameter rim portion of the shaft member-side annular member and the substantially L-shaped inner circumferential large-diameter step portion of the bearing member-side annular member face each other and are close to each other in the axial direction and the radial direction. Therefore, the shaft member is stopped from being pulled out of the bearing member.

In some embodiments, the plan-view shapes of the convex surface portions may be substantially diagonal, and inclined in the rotation direction in which the shaft member is rotated. The diagonal plan-view shapes may be a rhomboid shape or any other desired shape.

By so doing, both sidewall surfaces of the convex surface portions that form the reflux path, which are separated in a circumferential direction, are inclined in the rotation direction, so when the shaft member is rotated with respect to the bearing member, lubricant flows through the reflux path. There is less flow resistance, so torque becomes small when the rotation begins and stops, and rotation can smoothly begin and stop.

In some embodiments, the plan-view shapes of the convex surface portions may be formed in a substantially rectangular shape, a substantially inverted trapezoidal shape, or a substantially inverted triangle shape, outwardly extended in a radial direction.

In these embodiments, the shape of the reflux path does not depend on the direction of rotation of the shaft member with respect to the bearing member, so the reflux of lubricant can occur without being limited by the direction of the relative rotation of the shaft member.

In another aspect, some embodiments of the invention provide a spindle motor provided with the fluid dynamic pressure bearing device according to any of the above-described structures. The motor includes a stator that is fixed to a base member, a rotor that is constituted by a rotor hub forming a rotation element engaged to an upper end portion of the shaft member, and a rotor magnet that is engaged with the rotor hub and rotatably arranged with respect to the base member. The rotor magnet generates a rotation magnetic field in cooperation with the stator. Dynamic pressure grooves generate a dynamic pressure receiving a load in a thrust direction within the fluid dynamic pressure bearing device. The fluid dynamic pressure bearing device supports the rotation of the rotor, and the rotor is drawn by a magnetic force in a direction opposite to a direction in which the dynamic pressure acts. The load is supported by balancing the dynamic pressure and the magnetic force.

With this structure, a magnetic force can be balanced with a thrust-direction dynamic force generated in the dynamic pressure grooves within the fluid dynamic pressure bearing device. A gap of a micro gap portion facing the dynamic pressure grooves can be appropriately maintained, the relative rotation of the shaft body can be stabilized, and a smaller spindle motor with high reliability can be obtained.

In another aspect, some embodiments of the invention provide a recording disk drive device provided with the spindle motor described above. The recording disk drive device includes a recording head, which writes and/or reads information to/from a recording disk. The spindle motor rotatingly drives the recording disk.

With this structure, a smaller recording disk drive device with high reliability can be obtained.

Thus, in exemplary embodiments of a fluid dynamic pressure bearing device according to this invention, a reflux path formed on the step portion surface of a substantially L-shaped inner circumferential large-diameter step portion of the bearing member-side annular member is a reflux path formed by an open groove, hereafter also called a reflux groove. When the shaft member-side annular member vertically fluctuates at the time of relative rotation between the shaft member and the bearing member, lubricant can easily and promptly flow through the reflux path. The reflux path may allow lubricant to flow outwardly, in a radial direction or in a direction inclined from the radial direction, between the adjacent convex surface portions, from a micro gap formed between the small-diameter outer circumferential surface portion of the shaft member-side annular member and the small-diameter inner circumferential surface portion of the bearing member-side annular member. The lubricant may merge in a communication groove formed continuously with micro gaps between the large-diameter portion inner circumferential surface and the plurality of the convex surface portions, and then flow through a micro gap formed between the large-diameter rim portion outer circumferential surface and the large-diameter portion inner circumferential surface.

Even if abrupt vibration and/or shock is received at the time of handling, the shaft member-side annular member vertically fluctuates abruptly, and lubricant in a micro gap between the top surface of the large-diameter rim portion of the shaft member-side annular member and the step portion surface of the inner circumferential large-diameter step portion of the bearing member-side annular member receives an abrupt pumping operation, including drawing in and/or compression of the lubricant. Accordingly, lubricant can smoothly flow through the reflux path. At the same time, a function of suppressing splash or leakage of lubricant toward the outside opening portion can also be improved. Because of this, reliability of lubricant leakage suppression can be ensured, and high rotation precision can be maintained.

Additionally, the location where this type of pumping operation acts is a portion sandwiched by opposing surfaces. No thrust dynamic pressure generating grooves are formed in any of these opposing surfaces. Therefore, effects on the thrust dynamic pressure force can be eliminated.

Furthermore, the large-diameter rim portion of the shaft member-side annular member and the substantially L-shaped inner circumferential large-diameter step portion of the bearing member-side annular member face each other and are close to each other in the axial direction and the radial direction. Therefore, the shaft member is stopped from being pulled out of the bearing member.

Furthermore, when the plan-view shapes of the convex surface portions formed on the step portion surface of the inner circumferential large-diameter step portion of the bearing member-side annular member are a substantially diagonal shape that is inclined in the rotation direction of the shaft member, both sidewall surfaces of the convex surface portions that are separated in a circumferential direction and form the reflux path are inclined in the rotation direction. Therefore, when the shaft member is rotated with respect to the bearing member, lubricant flows through the reflux path. There is less flow resistance, so torque becomes small when the rotation begins and stops, and rotation can smoothly begin and stop.

Furthermore, when the plan-view shapes of the convex surface portions are a substantially rectangular shape outwardly extended in a radial direction, a substantially inverted trapezoidal shape outwardly extended in a radial direction, or a substantially inverted triangle shape outwardly extended in a radial direction, the shape of the reflux path does not depend on the direction of the relative rotation with respect to the bearing member of the shaft member. Therefore, the reflux of lubricant can occur without being limited by the direction of the relative rotation of the shaft member.

Furthermore, by having a spindle motor provided with a fluid dynamic pressure bearing device with the above-mentioned various effects, and a recording disk drive device provided with the spindle motor, a spindle motor and a recording disk drive device that are small and have high reliability can be obtained.

Additionally, a circumferential groove portion for lubricant splash suppression and a capillary seal portion to suppress lubricant from leaking are preferably formed at one end of a lubricant filling portion within the micro gap between the shaft member and the bearing member.

For example, in the small-diameter outer circumferential surface portion of the shaft member-side annular member, a lubricant splash suppression circumferential groove may be formed at the outward end portion. In the small-diameter inner circumferential surface portion of the bearing member-side annular member, a lubricant splash suppression circumferential groove may be formed at the outward end portion so as to face the circumferential groove formed in the small-diameter inner circumferential surface portion of the shaft member-side annular member.

Furthermore, the large-diameter rim portion of the shaft member-side annular member and the inner circumferential large-diameter step portion of the bearing member-side annular member may be arranged near to each other and facing each other in an axial direction and a radial direction, and the small-diameter outer circumferential surface portion of the shaft member-side annular member and the small-diameter inner circumferential surface portion of the bearing member-side annular member may be arranged near to each other and facing each other in a radial direction. This structure stops the shaft member from being pulled out of the bearing member, and also forms the capillary seal portion, the reflux path, and the lubricant splash suppression circumferential groove portion.

Additionally, a dynamic pressure groove that generates a dynamic pressure receiving a load in the radial direction is preferably formed in either the outer circumferential surface of the shaft member or the inner circumferential surface of the bearing member, and a dynamic pressure groove that generates a dynamic pressure receiving a load in a thrust direction is preferably formed in either the lower surface of the large-diameter rim portion of the shaft member-side annular member or one end surface of the bearing member facing the lower surface of the large-diameter rim portion.

A fluid dynamic pressure bearing device constituted as described above may be incorporated into a spindle motor. Furthermore, a spindle motor that is thus constituted may be applied to a spindle motor for a recording disk drive device.

These and other objects, advantages and features of the invention are described in or apparent from the following description of exemplary embodiments.

BRIEF DESCRIPTION OF THE DRAWINGS

Exemplary embodiments are described below with reference to the attached drawings, in which like numerals represent like parts, and in which.

DETAILED DESCRIPTION OF EMBODIMENTS

The following explains a first embodiment (embodiment 1) according to the invention.

Figure 1:
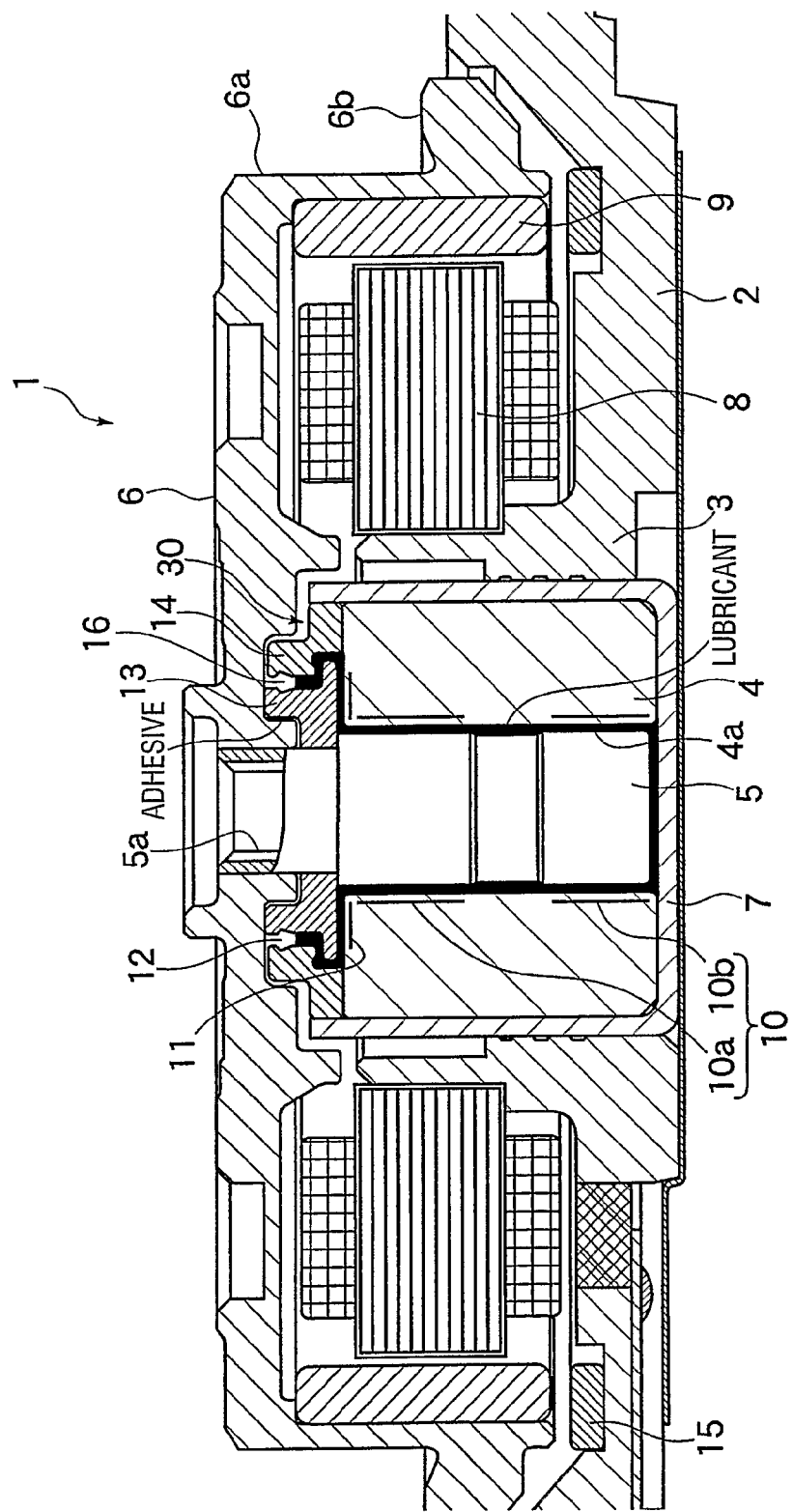
FIG. 1 is a vertical cross-sectional view of a spindle motor to which a fluid dynamic pressure bearing device of a first embodiment (embodiment 1) is applied.
Figure 2:
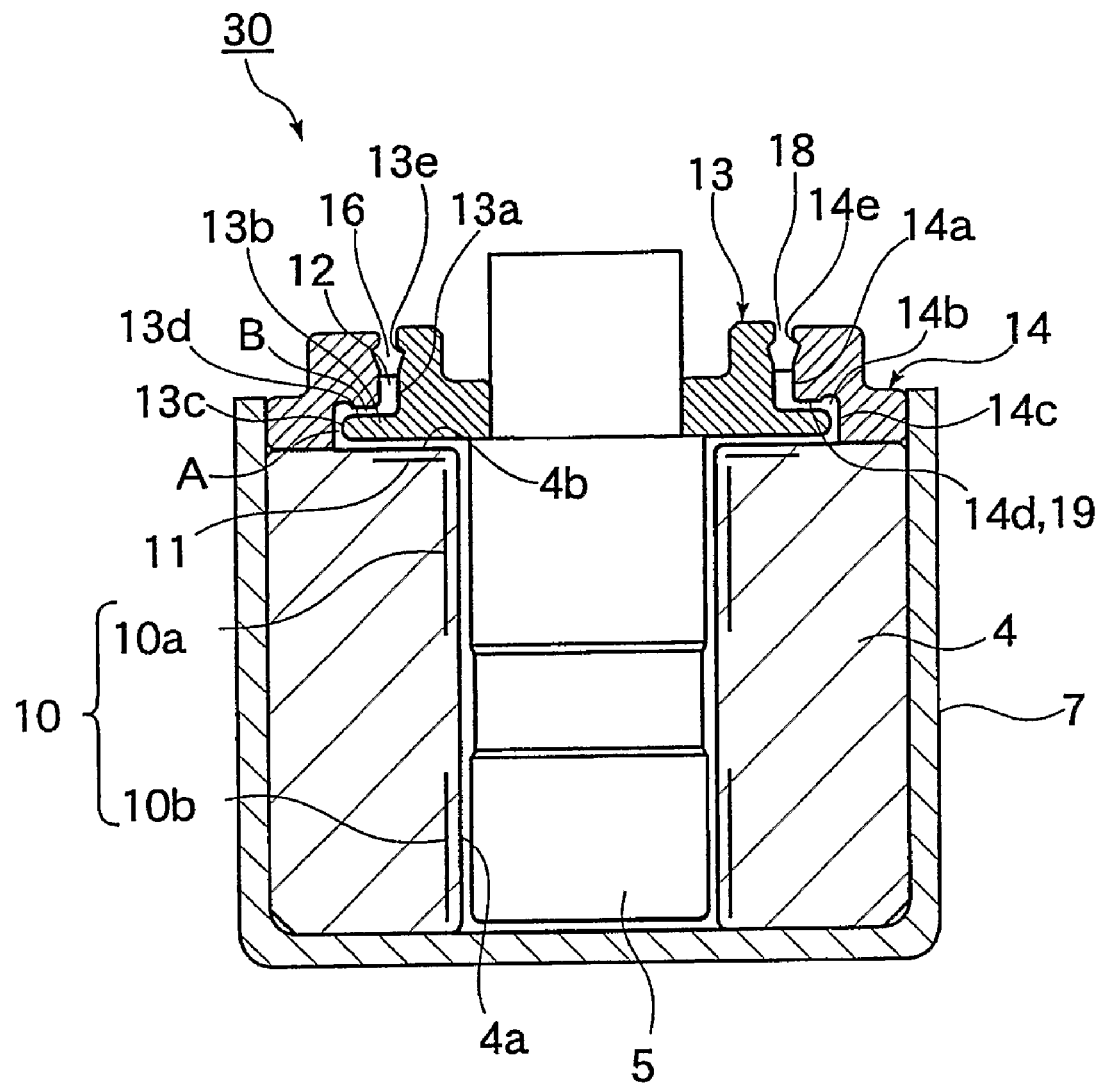
FIG. 2 is an enlarged view of the fluid dynamic pressure bearing device portion of FIG. 1.
Figure 3:
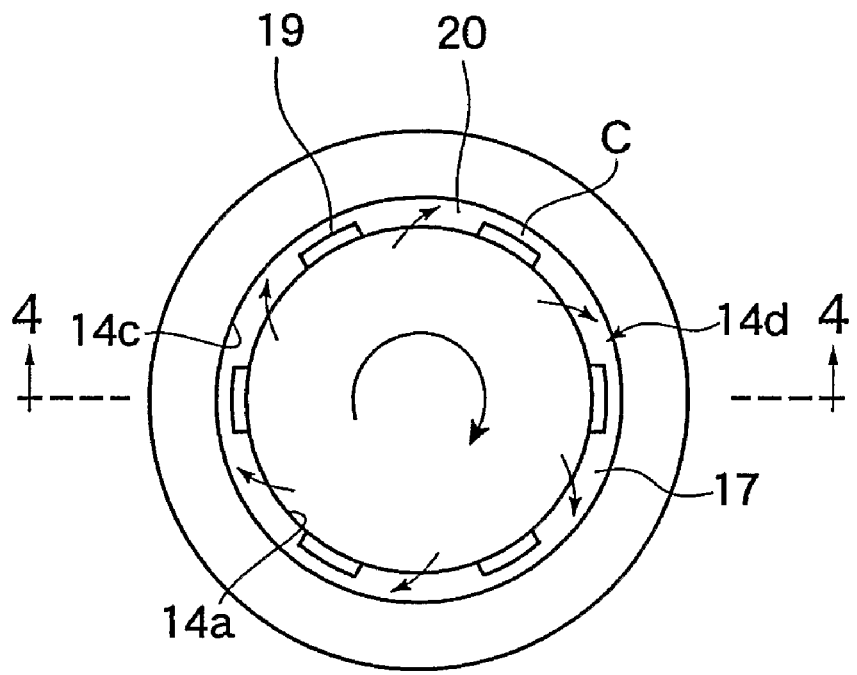
FIG. 3 illustrates a bottom surface of a bearing member-side annular member mounted to a bearing member of the fluid dynamic pressure bearing device.
Figure 4:
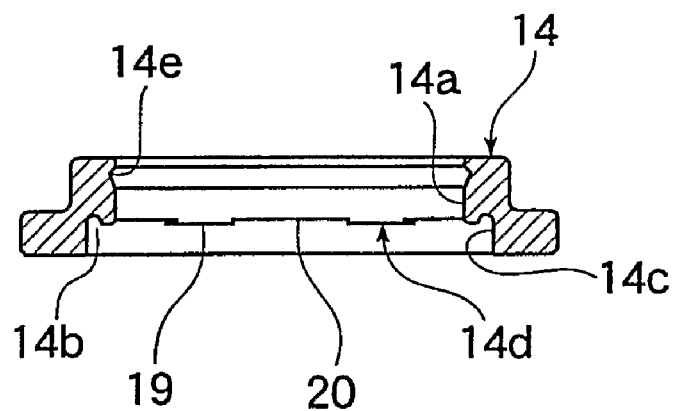
FIG. 4 is a cross section taken along line 4-4 of FIG. 3.

FIG. 1 is a vertical cross-sectional view of a spindle motor to which a fluid dynamic pressure bearing device of embodiment 1 is applied. FIG. 2 is an enlarged view of the fluid dynamic pressure bearing device. FIG. 3 illustrates a bottom surface of a bearing member-side annular member that is mounted to the bearing member of the fluid dynamic pressure bearing device. FIG. 4 is a cross section taken along line 4-4 of FIG. 3.

A spindle motor 1 to which a fluid dynamic pressure bearing device 30 of embodiment 1 is applied may be a spindle motor used as a drive source of a magnetic disk drive device. As shown in FIG. 1, a closed-bottom cylindrical member 7, in which a tubular sleeve forming a bearing member 4 of the fluid dynamic pressure bearing device 30 is engaged and fixed, is engaged with a cylindrical bearing holding portion 3 that is arranged perpendicular to the center portion of a base member 2. Furthermore, a shaft member 5 forming a rotation shaft is rotatably supported in a bearing hole 4a that is formed through a center portion of the bearing member (sleeve) 4. The base member 2 forms part of the base member constituting a casing of a magnetic disk drive device, described below.

A rotor member (rotor hub) 6 that rotates an undepicted disk mounted thereon is engaged to one end portion of the shaft member 5 of FIG. 1. The upper portion of the one end portion of the shaft member 5 has a reduced diameter. The disk is mounted on the surface of a flange portion 6b of a rotor member 6 and fixed to the rotor member 6 by an undepicted clamp member. A screw hole 5a formed in one end of the shaft member 5 is provided to fasten the clamp member and the rotor member 6 to the shaft member 5 using a screw.

A stator 8 is fixed to the base member 2. The stator 8 is concentric with the cylindrical bearing holding portion 3, and is outward from the cylindrical bearing holding portion 3 in a radial direction. Rotor magnets 9 are fixed to an inner circumferential surface of a tubular portion 6a of the rotor member 6 so as to face the stator 8, with a slight gap between the rotor magnets 9 and the stator 8. The rotor magnets are outward from the stator 8 in the radial direction. Therefore, the motor is an outer rotor type motor. A rotor is formed by the rotor member 6, also called a rotor hub hereafter, and the rotor magnets 9.

Lubricant is continuously filled within a micro gap including a radial dynamic pressure bearing portion 10 formed between the shaft member 5 and the bearing member 4 and a micro gap formed between an end surface (lower end surface of FIG. 1) of the bottom end portion of the shaft member 5 and the bottom surface of the closed-bottom cylindrical member 7. At the upper end side of the lubricant-filled portion within the micro gaps, a capillary seal portion 12, which suppresses leakage of the lubricant, is formed so as to communicate with the lubricant-filled portion via a thrust dynamic pressure bearing portion 11 that is described hereafter. Furthermore, a lubricant splash suppression circumferential groove portion 16 is formed near one end, upward from the capillary seal portion 12. The capillary seal portion 12 and the lubricant splash suppression circumferential groove portion 16 will be described later. As shown by 10a and 10b of FIG. 1, the radial dynamic pressure bearing portion 10 is formed at two locations in an axial direction.

On the shaft member 5 side, at a position corresponding to the capillary seal portion 12 and the lubricant splash suppression circumferential groove portion 16, a shaft member-side annular member 13, which is substantially convex in cross-section, is engaged with the shaft member 5. The shaft member-side annular member 13 may be engaged with the shaft member 5 by being press-fit, bonded, welded, or engaged in any combination of press-fitting, bonding and welding, to the reduced-diameter end portion of the shaft member 5. Alternatively, the shaft member-side annular member 13 may be engaged with the shaft member 5 by integrally forming the shaft member-side annular member 13 and the shaft member 5 from a single piece of material, although this approach may be more difficult in terms of manufacturing. The shaft member-side annular member 13 contacts the lower surface, in FIG. 1, of a center boss portion of the rotor member 6, and contacts the portion of the rotor member 6 surrounding the center boss portion. Furthermore, on the bearing member 4 side, at a position corresponding to the capillary seal portion 12 and the lubricant splash suppression circumferential groove portion 16, a bearing member-side annular member 14 is engaged with the upper end inner circumferential portion of the closed-bottom cylindrical member 7 by being press-fit, bonded, welded, or engaged in any combination of press-fitting, bonding and welding. The bearing member-side annular member 14 preferably is in contact with the upper end portion of the bearing member 4.

As shown in FIG. 1, the shaft member-side annular member 13 may be attached to the rotor member 6 by adhesive.

As shown in FIGS. 1 and 2, the shaft member-side annular member 13 has an annular shape that is substantially convex in cross-section, and is provided with a large-diameter rim portion 13b protruding outwardly in a radial direction at end of the member 13 that is inward, in the axial direction. The annular member 13 also has a small-diameter outer circumferential surface portion 13a that continues from the rim portion 13b in the axial direction toward the outward end side (upper end side in FIG. 1). In the small-diameter outer circumferential surface portion 13a, near the outward end, a lubricant splash suppression circumferential groove 13e is formed, which retains the lubricant.

Furthermore, as shown in FIGS. 1 and 2, the bearing member-side annular member 14 is provided with a substantially L-shaped inner circumferential large-diameter step portion 14b, on an inward end side in the axial direction, and a small-diameter inner circumferential surface portion 14a that continues from the large-diameter step portion 14b in the axial direction toward the outward end side. The inner circumferential large-diameter step portion 14b is formed by a large-diameter portion inner circumferential surface 14c and a step portion surface 14d that is substantially perpendicular to the large-diameter portion inner circumferential surface 14c. The large-diameter portion inner circumferential surface 14c faces a rim portion outer circumferential surface 13c of the shaft member-side annular member 13, and a micro gap A for a lubricant path is formed between surfaces 13c and 14c. Furthermore, the step portion surface 14d faces a rim portion upper surface 13d of the shaft member-side annular member 13, and a micro gap B for a lubricant path is formed between surfaces 13d and 14d.

The step portion surface 14d faces the rim portion upper surface 13d of the shaft member-side annular member 13, so a stop is formed that stops the entire shaft member 5 from being pulled out of the bearing member 4. At the same time, a reflux groove 17 (see FIG. 3), described hereafter, is formed on the surface of the step portion surface 14d. This reflux groove 17 is a significant part of at least some embodiments of the improved structure of the fluid dynamic pressure bearing device according to the invention. By so doing, a solution is provided for problems in conventional devices, that is, for example, the problem that when vibration or shock is significant due to rough handling, a fluctuation (vibration) velocity of the large-diameter rim portion 13b, that is, the velocity of the pumping operation, becomes abrupt, and lubricant movement due to the pumping operation cannot be followed, leading to lubricant leakage to the outside through the outside opening portion 18. Details of the reflux groove 17 will be described later.

Furthermore, the "outside opening portion 18" refers to the outside opening portion of a micro gap formed between the small-diameter inner circumferential surface portion 14a and the small-diameter outer circumferential surface portion 13a, but this is also the outside opening portion of the continuous body of the entire micro gap including the radial dynamic pressure bearing portion 10, the thrust dynamic pressure bearing portion 11, the capillary seal portion 12, the lubricant splash suppression circumferential groove portion 16, and so forth.

In addition, a lubricant splash suppression circumferential groove 14e, which forms a lubricant stop, is formed in the small-diameter inner circumferential surface portion 14a of the bearing member-side annular member 14. This lubricant splash suppression circumferential groove 14e is positioned facing the lubricant splash suppression circumferential groove 13e of the shaft member-side annular member 13. Therefore, when the circumferential grooves 13e and 14e are arranged near to each other and facing each other in a radial direction, a lubricant splash suppression circumferential groove portion 16 is formed.

Because the shaft member-side annular member 13 and the bearing member-side annular member 14 of the fluid dynamic pressure bearing device 30 of embodiment 1 are thus constituted, the large-diameter rim portion 13b of the shaft member-side annular member 13 and the inner circumferential large-diameter step portion 14b (large-diameter portion inner circumferential surface 14c, step portion surface 14d) of the bearing member-side annular member 14 are arranged near to each other and facing each other in the axial direction and the radial direction. The small-diameter outer circumferential surface portion 13a of the shaft member-side annular member 13 and the small-diameter inner circumferential surface portion 14a of the bearing member-side annular member 14 are arranged facing each other in a radial direction. Therefore, a structure is obtained by which the shaft member 5 is stopped from being pulled out of the bearing member 4. At the same time, the capillary seal portion 12, the reflux groove 17, and the lubricant splash suppression circumferential groove portion 16 are formed.

Here, the capillary seal portion 12 is formed by lubricant being filled in the micro gap formed between the small-diameter inner circumferential surface portion 14a and the small-diameter outer circumferential surface portion 13a, and a liquid surface being formed between the small-diameter inner circumferential surface portion 14a and the small-diameter outer circumferential surface portion 13a. As described before, this lubricant communicates with lubricant filled in a micro gap including the radial dynamic pressure bearing portion 10 formed between the shaft member 5 and the bearing member 4, a micro gap formed between the end surface of the bottom end portion of the shaft member 5 and the bottom surface of the closed-bottom cylindrical member 7, and a micro gap including the thrust dynamic pressure bearing portion 11. The lubricant forms a liquid surface at a position slightly below the lubricant splash suppression circumferential groove portion 16. Through a lubricant retention force due to capillarity, splashing and leakage of lubricant in the direction of the outside opening portion 18 are suppressed.

As described above, the lubricant in the capillary seal portion 12 uses a lubricant retention force due to capillarity, and splashing and leakage of lubricant in the direction of the outside opening portion 18 is suppressed. However, when strong vibration or a shock is given during handling, due to a pumping operation of the large-diameter rim portion 13b, there is a possibility that the liquid surface rises and reaches the lubricant splash suppression circumferential groove portion 16. In such a case, the respective ceiling surfaces of the two circumferential grooves 13e and 14e, which constitute the lubricant splash suppression circumferential groove portion 16, hold in and deflect downward the rising liquid surface and splashed lubricant, and splashing and leakage of lubricant in the direction of outside opening portion 18 can be effectively controlled.

With respect to the radial dynamic pressure bearing portion 10 (10a, 10b), in either the outer circumferential surface of the shaft member 5 or the inner circumferential surface of the bearing member 4, a dynamic pressure groove is formed which generates a dynamic pressure receiving a load in the radial direction. Furthermore, in the upper end surface 4b of the bearing member 4 facing the rim portion lower surface 13d of the shaft member-side annular member 13 of the shaft member 4, a dynamic pressure groove is formed which generates a dynamic pressure receiving a load in the thrust direction. A micro gap portion including a dynamic pressure groove that generates a dynamic pressure receiving a load in the thrust direction forms the thrust dynamic pressure bearing portion 11.

Therefore, if a current passes through the stator 8, and the spindle motor 1 begins to be rotated, the shaft member 5 is supported by a dynamic pressure force generated in the radial dynamic pressure bearing portion 10 (10a, 10b) in the radial direction and is rotated in a state in which it does not contact the bearing hole 4a of the bearing member 4. Furthermore, the shaft member-side annular member 13 engaged with the shaft member 5 is supported by a dynamic pressure force generated in the thrust dynamic pressure bearing portion 11 in the thrust direction and is rotated in a state in which it does not contact the upper end surface 4b of the bearing member 4.

On the top surface of the base member 2, at a position immediately below the rotor magnets 9, an annular attraction plate 15 is fixed, slightly spaced apart from the end portion of the rotor magnet 9. This attraction plate 15 attracts the rotor magnets 9, urges the entire rotor portion in the axial direction, and balances a floating force of the entire rotor portion due to the generated dynamic pressure of the thrust dynamic pressure bearing portion.

The following explains details of the structure of the reflux groove 17. As shown in FIG. 2, as described before, the bearing member-side annular member 14 is provided with a two-step structure having different inner diameters. The large-diameter portion inner circumferential surface 14c, which is a large-diameter-side step structure, forms a micro gap with the opposing rim portion outer circumferential surface 13c of the shaft member annular member 13 and forms a micro gap A for a lubricant path. The small-diameter inner circumferential surface portion 14a, which is the small-diameter-side step structure, forms a micro gap with the opposing small-diameter outer circumferential surface portion 13a of the shaft member-side annular member 13 and forms the capillary seal portion 12. Furthermore, the circumferential groove 14e formed in one end portion of the small-diameter inner circumferential surface portion 14a faces the circumferential groove 13e formed in one end portion of the small-diameter outer circumferential surface portion 13a of the shaft member-side annular member 13, and forms the lubricant splash suppression circumferential groove portion 16 that stops the lubricant therein.

The large-diameter portion inner circumferential surface 14c of the bearing member-side annular member 14 and the step portion surface 14d substantially perpendicular to the large-diameter portion inner circumferential surface 14c form the inner circumferential large-diameter step portion 14b. The step portion surface 14d faces the rim portion upper surface 13d of the shaft member-side annular member 13, and a micro gap B for a lubricant path is formed between the surfaces 13d and 14d. The large-diameter-side end surface of the bearing member-side annular member 14 contacts the part of the surface of the upper end surface 4b of the bearing member 4 that extends outwardly from the part of the surface in which the thrust dynamic pressure groove is formed. The bearing member-side annular member 14 is engaged with the inner circumference of the open end side of the closed-bottom cylindrical member 7 in this state.

FIG. 3 shows details of a reflux groove structure of the first embodiment (embodiment 1). In embodiment 1, a plurality of convex surface portions 19 and a plurality of concave surface portions 20 are formed on the step portion surface 14d at an equal interval in the circumferential direction. The plurality of convex surface portions 19 may be coplanar and the plurality of concave surface portions 20 may also be coplanar. The plan-view shapes of the convex surface portions 19 may be substantially rectangular as shown. A micro gap remains between the radial direction outer end surface of the respective convex surface portions 19 and the large-diameter portion inner circumferential surface 14c, and an annular communication groove C is formed which connects these micro gaps. All of the concave surface portions 20 are continuous with, and may be on the same plane as, the communication groove C. In the communication groove C, the portion excluding the micro gap which remains between the radial direction outer end surface of the convex surface portions 19 and the large-diameter portion inner circumferential surface 14c is an imaginary groove portion located outside of the concave surface portions 20. The concave surface portions 20 and the communication groove C form the reflux groove 17, which forms the lubricant reflux path. The size (area and depth) and number of the convex surface portions 19 may be determined by the amount of filled-in lubricant, the amount of lubricant movement during rotation, the rotation torque, the size of vibration or shock, and/or the like.

In the case of the embodiment 1, formation of the convex surface portions 19 and the concave surface portions 20 can be easily processed. Additionally, the reflux of lubricant around the periphery of the convex surface portions 19 and in the direction of the micro gap A from the deepest locations around the convex surface portions 19 has a characteristic such that there is no restriction due to the rotation direction of the shaft member 5. In other words, the shaft member 5 may be rotated in either direction. In addition, the size of the concave surface portions 20 on the step portion surface 14d can be formed so as to be sufficiently large with respect to the convex surface portions 19. In this case, the lubricant amount in the concave surface portions 20 and the communication groove C portion is slightly larger than the lubricant amount in the micro gap B between the convex surface portions 19 and the rim portion upper surface 13d. Therefore, even if a pumping operation is generated due to fluctuation or vibration of the large-diameter rim portion 13b, the movement of the lubricant within the micro gap B to the concave surface portions 20 is promptly performed without being affected by the fluctuation of the lubricant amount within the micro gap B. Vibration or shock is sufficiently handled, and the effect of suppressing lubricant from leaking outside to the opening portion 18 can be significantly improved.

Furthermore, when the shaft member-side annular member 13 is rotated along with the shaft member 5, the rim portion upper surface 13d is rotated relative to the step portion surface 14d of the bearing member-side annular member 14. Thus, the lubricant in the micro gap B between the surfaces 13d and 14d generates a turbulent flow; however, a sufficient lubricant reflux operation can be performed by the reflux groove 17 formed on the step portion surface 14d. Therefore, the turbulent flow can be suppressed, a pressure increase within the micro gap B due to the turbulent flow can be controlled, splashing and leakage of lubricant to the capillary seal portion 12 can be suppressed, and the introduction of bubbles due to turbulent flow can be suppressed. This effect of suppressing the introduction of bubbles also improves the life span of the fluid dynamic pressure bearing device.

The following explains a second embodiment (embodiment 2).

Figure 5:
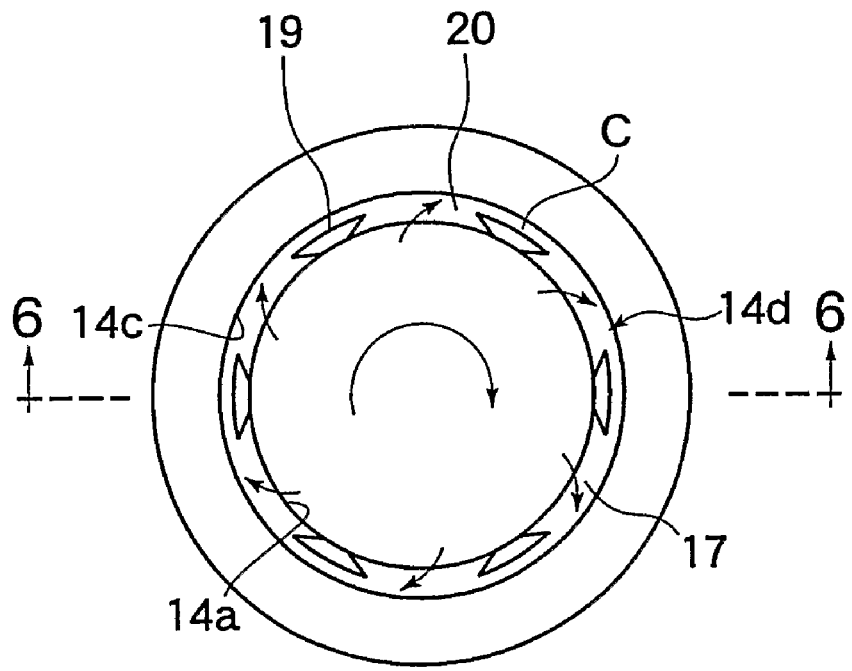
FIG. 5 illustrates a bottom surface of a bearing member-side annular member mounted to a bearing member of a fluid dynamic pressure bearing device of a second embodiment (embodiment 2)
Figure 6:
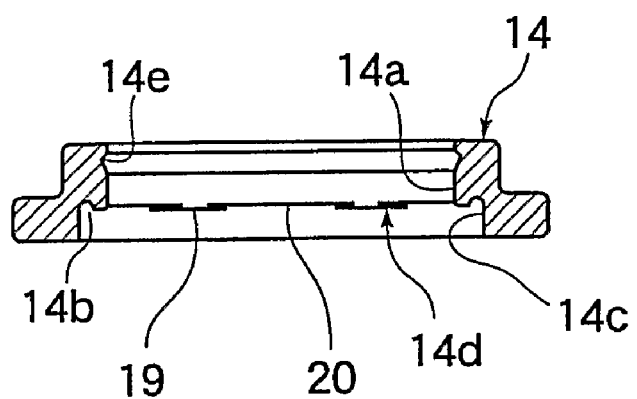
FIG. 6 is a cross section taken along line 6-6 of FIG. 5.

FIG. 5 illustrates a bottom surface of a bearing member-side annular member mounted to a bearing member of a fluid dynamic pressure bearing device of embodiment 2. FIG. 6 is a cross section taken along line 6-6 of FIG. 5.

As shown in FIG. 5, the bearing member-side annular member 14 of embodiment 2 is different from that of the embodiment 1 because the plan-view shapes of the convex surface portions 19 formed on the step portion surface 14d are formed in a substantially inverted trapezoidal shape, or a substantially inverted triangle shape, outwardly extended in a radial direction in plan view.

In the bearing member-side annular member 14 of embodiment 2, because the plan-view shapes of the convex surface portions 19 formed on the step portion surface 14d are thus formed, the arc length of the convex surface portions 19 is short on the inner circumferential surface of the small-diameter inner circumferential surface portion 14a. Because of this, the reflux path formed on the small-diameter inner circumferential surface portion 14a is short, the movement of lubricant to the concave surface portions 20 is promptly performed, and reflux resistance becomes small. Therefore, reflux becomes easy, there is less movement of lubricant to the capillary seal portion 12, and lubricant leakage can be reduced. At the same time, effects also can be obtained with respect to the method of processing the concave surface portions 20, such as good processability in the case of end mill processing or electrolytic processing, easy manufacturing of a jig, and the like.

Furthermore, in the same manner as in embodiment 1, the size (area and depth) and number of the convex surface portions 19 may be determined by the amount of the filled-in lubricant, the amount of lubricant movement during rotation, the rotation torque, the size of vibration or shock, and/or the like. The reflux of lubricant around the periphery of the convex surface portions 19 and in the direction of the micro gap A from the deepest locations around the convex surface portions 19 has a characteristic such that there is no restriction due to the rotation direction of the shaft member 5. In other words, the shaft member 5 may rotate in either direction. The size of the concave surface portions 20 on the step portion surface 14d can be formed to be sufficiently large with respect to the convex surface portions 19. In this case, the lubricant amount in the communication groove C portion and the concave surface portions 20 is slightly larger than the lubricant amount in the micro gap B between the convex surface portions 19 and the rim portion top surface 13d. Therefore, even if a pumping operation is generated due to fluctuation (vibration) of the large-diameter rim portion 13b, movement of lubricant within the micro gap B to the concave surface portions 20 is promptly performed without being affected by the change of the lubricant amount within the micro gap B. Vibration or shock is sufficiently handled, and the effect of suppressing lubricant from leaking to the outside opening portion 18 can be significantly improved.

The following explains a third embodiment (embodiment 3).

Figure 7:
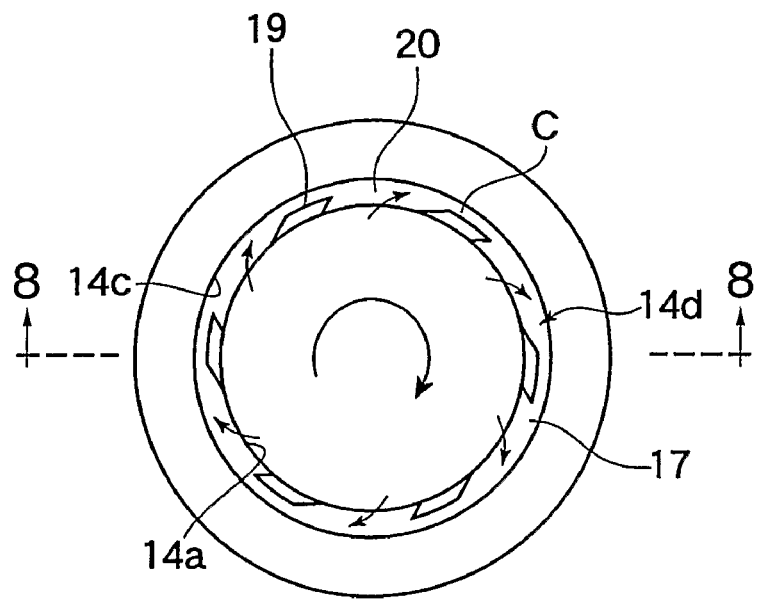
FIG. 7 illustrates a bottom surface of a bearing member-side annular member mounted to a bearing member of a fluid dynamic pressure bearing device of a third embodiment (embodiment 3)
Figure 8:
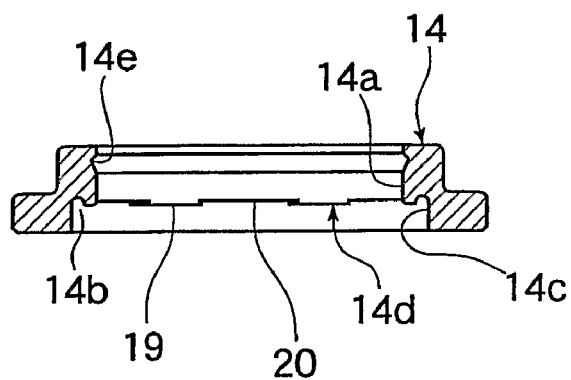
FIG. 8 is a cross section taken along line 8-8 of FIG. 7.

FIG. 7 illustrates a bottom surface of a bearing member-side annular member mounted to a bearing member of a fluid dynamic pressure bearing device of embodiment 3. FIG. 8 is a cross section taken along line 8-8 of FIG. 7.

As shown in FIG. 7, the bearing member-side annular member 14 of embodiment 3 is different from embodiments 1 and 2, because the plan-view shapes of the convex surface portions 19 formed on the step portion surface 14d are a substantially diagonal shape that is inclined in the rotation direction in which the shaft member 5 is rotated. The diagonal shape may be a rhomboid shape or any other desired diagonal shape.

In the bearing member-side annular member 14 of embodiment 3, because the plan-view shapes of the convex surface portions 19 formed on the step portion surface 14d are thus formed, lubricant in the micro gap B between the step portion surface 14d and the rim portion top surface 13d flows back along inclined surfaces at both ends of the convex surface portions 19 due to the rotation of the shaft member-side annular member 13. Because of this, flow resistance of the movement of lubricant onto the concave surface portions 20 becomes smaller than that in embodiments 1 and 2, and the rotation torque can be made small.

At the same time, in the same manner as the embodiments 1 and 2, the size (area and depth) and number of the convex surface portions 20, and the inclination angles of the convex surface portions 20 may be determined by the amount of the filled-in lubricant, the amount of lubricant movement during rotation, the rotation torque, the size of vibration or shock, and/or the like. In the case of embodiment 3, a restriction is placed on the rotation direction. However, the size of the concave surface portions 20 on the step portion surface 14d can be formed to be sufficiently large with respect to the convex surface portions 19. In this case, the lubricant amount in the communication groove C portion and the concave surface portions 20 is slightly larger than the lubricant amount in the micro gap B between the convex surface portions 19 and the rim portion top surface 13d. Therefore, even if a pumping operation is generated due to fluctuation (vibration) of the large-diameter rim portion 13b, movement of lubricant within the micro gap B to the concave surface portions 20 is promptly performed without being affected by the change of the lubricant amount within the micro gap B. Vibration or shock is sufficiently handled, and the effect of suppressing lubricant from leaking to the outside opening portion 18 can be significantly improved.

The following explains a fourth embodiment (embodiment 4).

Figure 9:
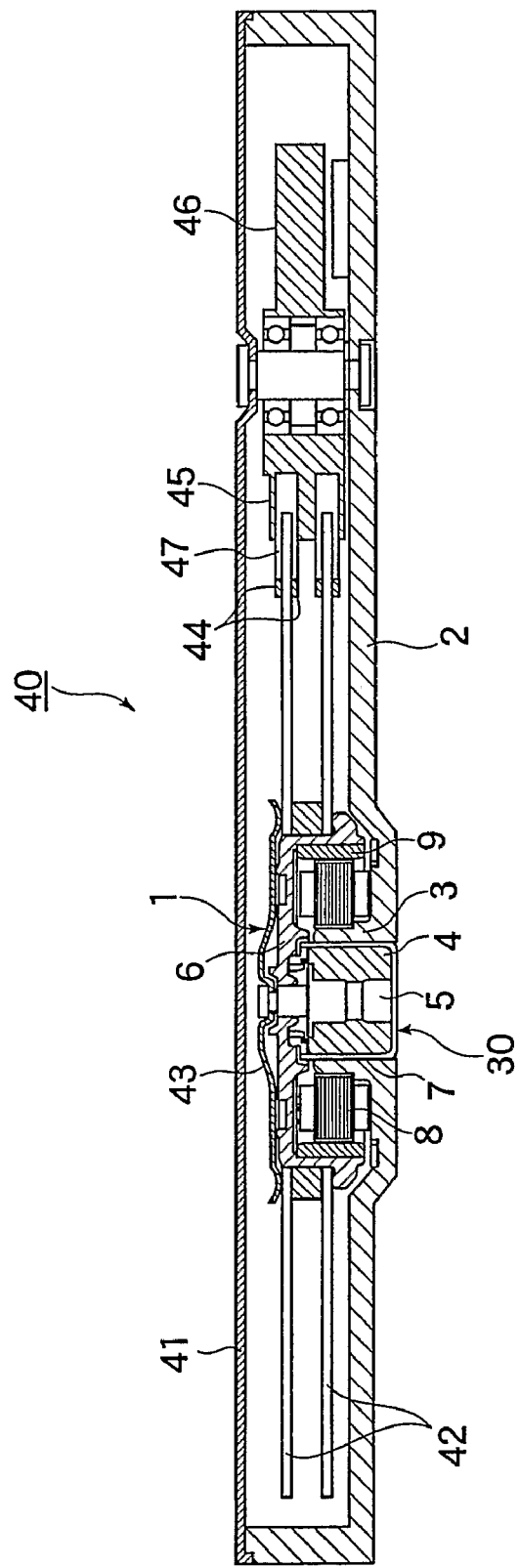
FIG. 9 is a cross-sectional view of a magnetic disk drive device in which a spindle motor is mounted to which a fluid dynamic pressure bearing device of a fourth embodiment (embodiment 4)
Figure 10:
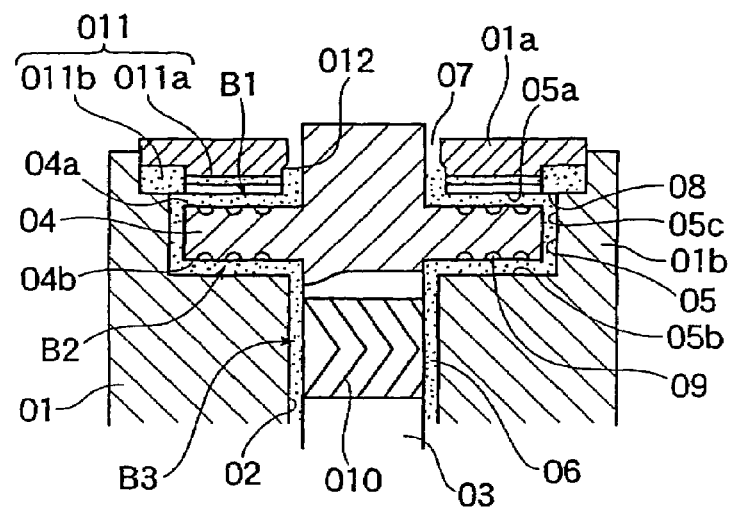
FIG. 10 is a partial cross-sectional view of a conventional fluid dynamic pressure bearing device.
Figure 11:
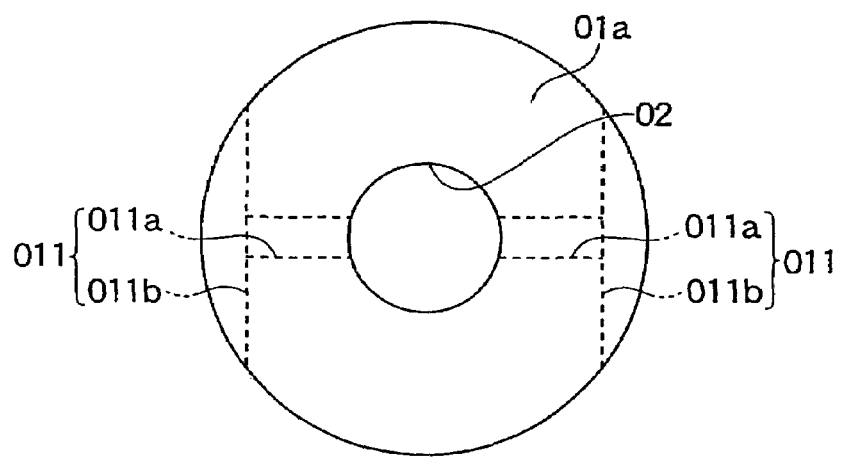
FIG. 11 is a plan view of a separate housing portion of the fluid dynamic pressure bearing device.
Figure 12:
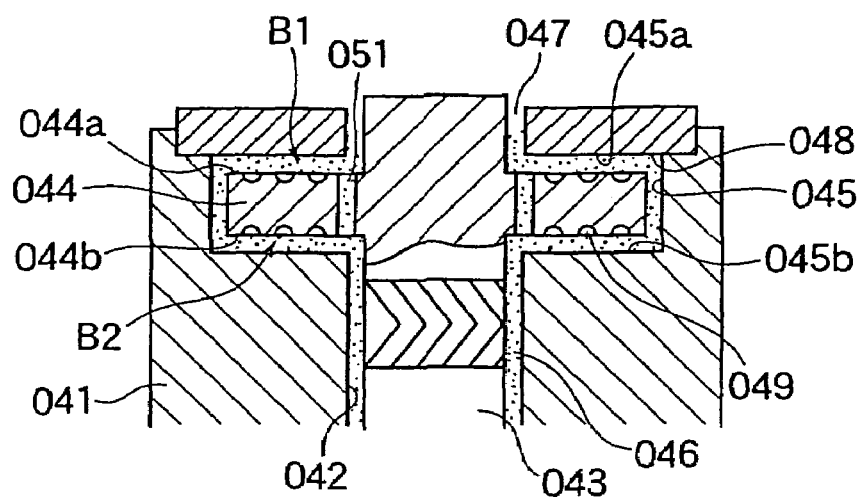
FIG. 12 is a partial cross-sectional view of another conventional fluid dynamic pressure bearing device.

FIG. 9 is a cross-sectional view of a magnetic disk drive device of embodiment 4. In the magnetic disk drive device, a spindle motor 1 is mounted, to which the fluid dynamic pressure bearing device 30 of any of embodiments 1-3 is applied.

As shown in FIG. 9, in the magnetic disk drive device 40 of embodiment 4, the base member 2 is covered from above by a cover member 41, so a sealed casing is formed, and a clean space with extremely little dust or the like is maintained therein. The magnetic disk drive device 40 is constituted by the base member 2, the cover member 41, the spindle motor 1, magnetic disks 42, a clamp member 43 that holds the magnetic disks 42, recording heads 44 that write and/or read information to or from the magnetic disks 42, arms 45 that support the recording heads 44, a voice coil motor 46 that moves the recording heads 44 and the arms 45 to a predetermined position, and the like. Two magnetic disks 42 are mounted to a rotor hub 6, but the number of magnetic disks is not limited to this. The magnetic disks 42 are rotated along with rotation of the rotor hub 6.

Pairs of upper and lower recording heads 44 are fixed to the tip end portions of head stack assemblies 47 fixed to the arms 45, which are rotatably supported with respect to an appropriate location of the bottom portion of the base member 2. These pairs of upper and lower recording heads 44 are each arranged so as to sandwich one magnetic disk 42, and to write and/or read information with respect to both surfaces of the magnetic disk 42. Therefore, a pair of recording heads 44 is arranged for each magnetic disk 42. In this magnetic disk drive device 40, two magnetic disks 42 are constituted, so as shown in FIG. 9, two pairs of recording heads 44 are arranged.

The magnetic disk drive device 40 of embodiment 4 is thus constituted. A spindle motor 1 can be mounted, to which the fluid dynamic pressure bearing device 30 of any of the embodiments 1-3, or a modification thereof, is applied. In this case, a magnetic disk drive device 40 with high reliability can be obtained in which lubricant does not leak due to external vibration or shock that is applied when the motor is stopped and rotated. Splash suppression function is excellent, and miniaturization is facilitated.

Furthermore, the invention of this application is not limited to the above-mentioned embodiments. Various modifications are possible within the scope of the invention.

For example, in embodiments 1-3, the bearing member-side annular member 14 of the fluid dynamic pressure bearing device 30 is engaged with the upper end inner circumferential portion of the closed-bottom cylindrical member 7, but the invention is not limited to this. It is acceptable not to use a closed-bottom cylindrical member 7. In this case, an annular concave portion can be arranged on the upper end surface of the bearing member 4, and the bearing member-side annular member 14 can be engaged with and fixed to the concave portion. In addition, Japanese Patent Application 2004-031448, filed by the same applicant as this application, discloses variations of the closed-bottom cylindrical member 7.

Furthermore, for example, in embodiment 4, the disk drive device on which the spindle motor 1 is mounted is the magnetic disk drive device 40. However, instead of the magnetic disk, a recording disk also can be CD, DVD, etc. The spindle motor 1 can be applied to a recording disk drive device for driving these recording disks.

What is claimed is:

1. A fluid dynamic pressure bearing device, comprising:
   a shaft member;
   a bearing member, at least one of the shaft member or the bearing member being rotatable with respect to the other, a micro gap being formed between the shaft member and the bearing member;
   a shaft member-side annular member fixed with respect to the shaft member, the shaft member-side annular member having an axially inward end portion and an axially outward end portion, the shaft member-side annular member including:
      a large-diameter rim portion protruding outwardly in a radial direction, and a small-diameter outer circumferential surface portion, continuing from the large-diameter rim portion toward the axially outward end portion;

a bearing member-side annular member fixed with respect to the bearing member, the bearing member-side annular member having an axially inward end portion and an axially outward end portion, the bearing member-side annular member including:

an inner circumferential large-diameter step portion, and a small-diameter inner circumferential surface portion continuing from the inner circumferential large-diameter step portion toward the axially outward end portion;

a plurality of convex surface portions circumferentially formed either on a surface of the inner circumferential large-diameter step portion facing the large-diameter rim portion of the shaft member-side annular member, or on a surface of the large-diameter rim portion of the shaft member-side annular member facing a surface of the inner circumferential large-diameter step portion;

at least one concave portion separating the plurality of convex surface portions;

a reflux groove surrounding the convex surface portions, the reflux groove allowing flow of lubricant;

at least one first dynamic pressure groove formed in either an outer circumferential surface of the shaft member or an inner circumferential surface of the bearing member, the at least one first dynamic pressure groove generating a dynamic pressure receiving a load in a radial direction; and at least one second dynamic pressure groove formed in either the lower surface of the large-diameter rim portion of the shaft member-side annular member or one end surface of the bearing member facing the lower surface of the large-diameter rim portion, the at least one second dynamic pressure groove generating a dynamic pressure receiving a load in a thrust direction.

2. The fluid dynamic pressure bearing device according to claim 1,
wherein plan-view shapes of the convex surface portions are a substantially diagonal shape that is inclined in a direction of rotation of the shaft member.

3. The fluid dynamic pressure bearing device according to claim 1,
wherein plan-view shapes of the convex surface portions are one of a substantially rectangular shape outwardly extended in a radial direction, a substantially inverted trapezoid shape outwardly extended in a radial direction, or a substantially inverted triangle shape outwardly extended in a radial direction.

4. The fluid dynamic pressure bearing device according to claim 1, further comprising:
a first lubricant splash suppression circumferential groove formed in the outward end portion of the small-diameter outer circumferential surface portion of the shaft member-side annular member; and
a second lubricant splash suppression circumferential groove formed in the outward end portion of the small-diameter inner circumferential surface portion of the bearing member-side annular member so as to face the first lubricant splash suppression circumferential groove.

5. The fluid dynamic pressure bearing device according to claim 1, wherein the bearing member-side annular member stops the shaft member from being pulled out of the bearing member.

6. A spindle motor provided with the fluid dynamic pressure bearing device according to claim 1, comprising:
a stator that is fixed to a base member; and
a rotor that is rotatably arranged with respect to the base member, the rotor including:
a rotor hub that forms a rotation element engaged to an upper end portion of the shaft member, and
a rotor magnet that is engaged to the rotor hub and generated a rotation magnetic field in cooperation with the stator; wherein
the fluid dynamic pressure bearing device supports rotation of the rotor, and
the rotor is drawn by a magnetic force in a direction opposite to a direction in which a dynamic pressure acts, the dynamic pressure being generated by the at least one second dynamic pressure groove, and weight of the rotor being supported by balancing the dynamic pressure and the magnetic force.

7. A recording disk device provided with the spindle motor according to claim 6, comprising:
a recording head, which writes and/or reads information to/from a recording disk;
wherein the spindle motor rotatingly drives the recording disk.

* * * * *